(12) United States Patent
Strand (10) Patent No.: US 9,069,994 B1
(45) Date of Patent: Jun. 30, 2015

(54) AUDIBLE ALERT FOR STOLEN USER DEVICES

(71) Applicant: AMAZON TECHNOLOGIES, INC., Reno, NV (US)

(72) Inventor: William Alexander Strand, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/044,760

(22) Filed: Oct. 2, 2013

Related U.S. Application Data (62) Division of application No. 12/961,303, filed on Dec. 6, 2010, now Pat. No. 8,551,186.

(51) Int. Cl.
| | | |
|---|---|---|
| *H04L 29/06* | (2006.01) | |
| *G06F 21/88* | (2013.01) | |
| *G06F 21/31* | (2013.01) | |
| *G06F 21/60* | (2013.01) | |

(52) U.S. Cl.
CPC ............... *G06F 21/88* (2013.01); *G06F 21/31* (2013.01); *G06F 21/60* (2013.01)

(58) Field of Classification Search
CPC .......... G06F 21/88; G06F 21/51; G06F 21/60
USPC ...................................................... 726/35, 18
See application file for complete search history.

(56) References Cited

U.S. PATENT DOCUMENTS

| | | | | |
|---|---|---|---|---|
| 5,872,515 A * | 2/1999 | Ha et al. | ........................ | 340/571 |
| 5,889,866 A * | 3/1999 | Cyras et al. | .................... | 713/192 |
| 6,014,085 A * | 1/2000 | Patel | .............................. | 455/410 |
| 6,433,685 B1 * | 8/2002 | Struble et al. | .................. | 340/571 |
| 6,725,379 B1 * | 4/2004 | Dailey | .............................. | 726/35 |
| 7,024,700 B1 * | 4/2006 | Horikoshi et al. | ............... | 726/34 |
| 7,518,508 B2 * | 4/2009 | Cvek | ........................... | 340/545.6 |
| 2001/0047488 A1 * | 11/2001 | Verplaetse et al. | ............ | 713/202 |
| 2002/0121975 A1 * | 9/2002 | Struble et al. | ............... | 340/571 |
| 2002/0171546 A1 * | 11/2002 | Evans et al. | .................... | 340/540 |
| 2004/0053654 A1 * | 3/2004 | Kokumai et al. | .................. | 463/1 |
| 2004/0059914 A1 * | 3/2004 | Karaoguz | ...................... | 713/168 |
| 2004/0093527 A1 * | 5/2004 | Pering et al. | ................... | 713/202 |
| 2004/0172535 A1 * | 9/2004 | Jakobsson et al. | ............ | 713/168 |
| 2004/0188519 A1 * | 9/2004 | Cassone | ......................... | 235/382 |
| 2004/0190718 A1 * | 9/2004 | Dacosta | ......................... | 380/247 |
| 2005/0071671 A1 * | 3/2005 | Karaoguz | ...................... | 713/200 |
| 2006/0005264 A1 * | 1/2006 | Lin et al. | .......................... | 726/35 |
| 2006/0021007 A1 * | 1/2006 | Rensin et al. | ...................... | 726/2 |
| 2006/0069921 A1 * | 3/2006 | Camaisa et al. | .............. | 713/182 |
| 2006/0244590 A1 * | 11/2006 | Itoh et al. | ................. | 340/539.23 |
| 2007/0005967 A1 * | 1/2007 | Mister et al. | ................... | 713/168 |
| 2007/0094508 A1 * | 4/2007 | Palum et al. | ................... | 713/176 |
| 2007/0103300 A1 * | 5/2007 | Peng | .............................. | 340/571 |
| 2007/0205895 A1 * | 9/2007 | Bergener | .................... | 340/572.1 |
| 2007/0241861 A1 * | 10/2007 | Venkatanna et al. | ......... | 340/5.52 |
| 2008/0065883 A1 * | 3/2008 | Zeng et al. | .................... | 713/168 |

(Continued)

*Primary Examiner* — Michael S McNally (74) *Attorney, Agent, or Firm* — Lowenstein Sandler LLP (57) ABSTRACT

Tracking modes of a user device is described. In one method, the user device tracks the user device in a stolen mode and an elevated mode. The user device generates a challenge to authenticate a user as an owner of the user device when the user device is in the elevated mode. The challenge includes a question about a list of history items comprising at least one counterfeit history item and at least one valid history item. The user device generates an audible alert when the user device is in the stolen mode.

20 Claims, 8 Drawing Sheets

(56) References Cited

U.S. PATENT DOCUMENTS

| | | | |
|---|---|---|---|
| 2008/0102791 A1* | 5/2008 | Lauridsen et al. | 455/410 |
| 2008/0134303 A1* | 6/2008 | Rekimoto | 726/4 |
| 2009/0100530 A1* | 4/2009 | Chen | 726/29 |
| 2010/0268644 A1* | 10/2010 | Sobel et al. | 705/44 |
| 2011/0215921 A1* | 9/2011 | Ben Ayed et al. | 340/539.11 |
| 2011/0252464 A1* | 10/2011 | Sanjeev | 726/7 |
| 2011/0289570 A1* | 11/2011 | Yang et al. | 726/7 |
| 2012/0278907 A1* | 11/2012 | Wehrenberg | 726/35 |

\* cited by examiner

AUDIBLE ALERT FOR STOLEN USER DEVICES

RELATED APPLICATIONS

This application is a divisional application of U.S. patent application Ser. No. 12/961,303, filed Dec. 6, 2010, the entire contents of which are hereby incorporated by reference.

FIELD OF INVENTION

Embodiments of the invention relate to user devices, and more particularly, to alerting others of a stolen user device.

BACKGROUND OF THE INVENTION

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, and the like. Due to improved network connectivity and the portability of electronic devices, it has become common for the users to carry their devices with them anywhere they go, including buses, trains, airplanes, restaurants, bars, hotels, shops, libraries, beaches, etc. Hence, there is a higher chance that a user device can be lost or stolen while a user is away from home.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Methods and systems for generating an audible alert when a user device is stolen are described. A user device may be any mobile device, most of which can connect to a network. Examples of such user devices include electronic book readers, cellular telephones, personal digital assistants (PDAs), portable media players, tablet computers, netbooks, and the like. A user device may connect to a network to obtain content from a server (e.g., an item providing system) or to perform other activities.

In one embodiment, a user device determines that the user device is no longer in an owner's possession and generates an audible alert when the user device has been stolen. The user device may determine that it has been stolen by receiving a stolen notification from a server computing system (e.g., an item providing system). When the user device receives the stolen notification, the user device generates the audible alert. The user device may also determine by itself that the user device has been stolen as described in embodiments herein. For example, in one embodiment, the user device detects that a user of the user device needs to be authenticated, and prompts the user to respond to a challenge based on data stored on the user device to authenticate the user as an owner of the user device. When the user fails to authenticate, the user device generates the audible alert. For example, the user device may be an electronic book reader that can detect that it might be stolen (i.e., needs to authenticate the user as an owner), and can generate a screen on a display of the electronic book reader that includes a list of reading items that the legitimate owner has either read or purchased, mixed with one or more reading items that the legitimate owner has not read or purchased. The user must identify which of the list of reading items the user has read or purchased. This routine creates a combination lock for the electronic book reader, and if the combination is wrong, the audible alert goes off. In other embodiments, other usage data and/or location data stored on the user device may be used to generate the challenge. Alternatively, user passwords or other personal identifying information may be used for the authentication challenge.

In another embodiment, the user device tracks modes of the user device, including a stolen mode, an elevated mode, and a normal mode. The user device generates an audible alert when the user device is in the stolen mode. The user device transitions to the stolen mode when the user device has been stolen, and transitions to the elevated mode when the user needs to be authenticated. Based on verification of the challenge generated in the elevated mode, the user device may transition to the normal mode when the user is authenticated as the owner, and may transition to the stolen mode when the user is not authenticated as the owner. In the stolen mode and/or the elevated mode, the user device may disable one or more features of the user device.

It is unfortunate when a user device is stolen, especially when the thief can become invisible since user devices are prevalent and can look very similar, especially in public transit environments. The embodiments described herein can generate an audible alert when the user device is suspected of being stolen. The alert may be a very loud and embarrassing noise, resulting in a similar effect of when a paint bomb goes off when a thief steals a moneybag from a bank, for example. When the paint bomb goes off everyone knows that the thief has stolen the bag. Similarly, when the user device determines that the user device has been stolen, everyone knows that the thief has stolen the user device and looks at the thief because of the audible alert. The audible alert may be a recording that the user device has been stolen or may be other noises that attract attention to the thief.

Figure 1:
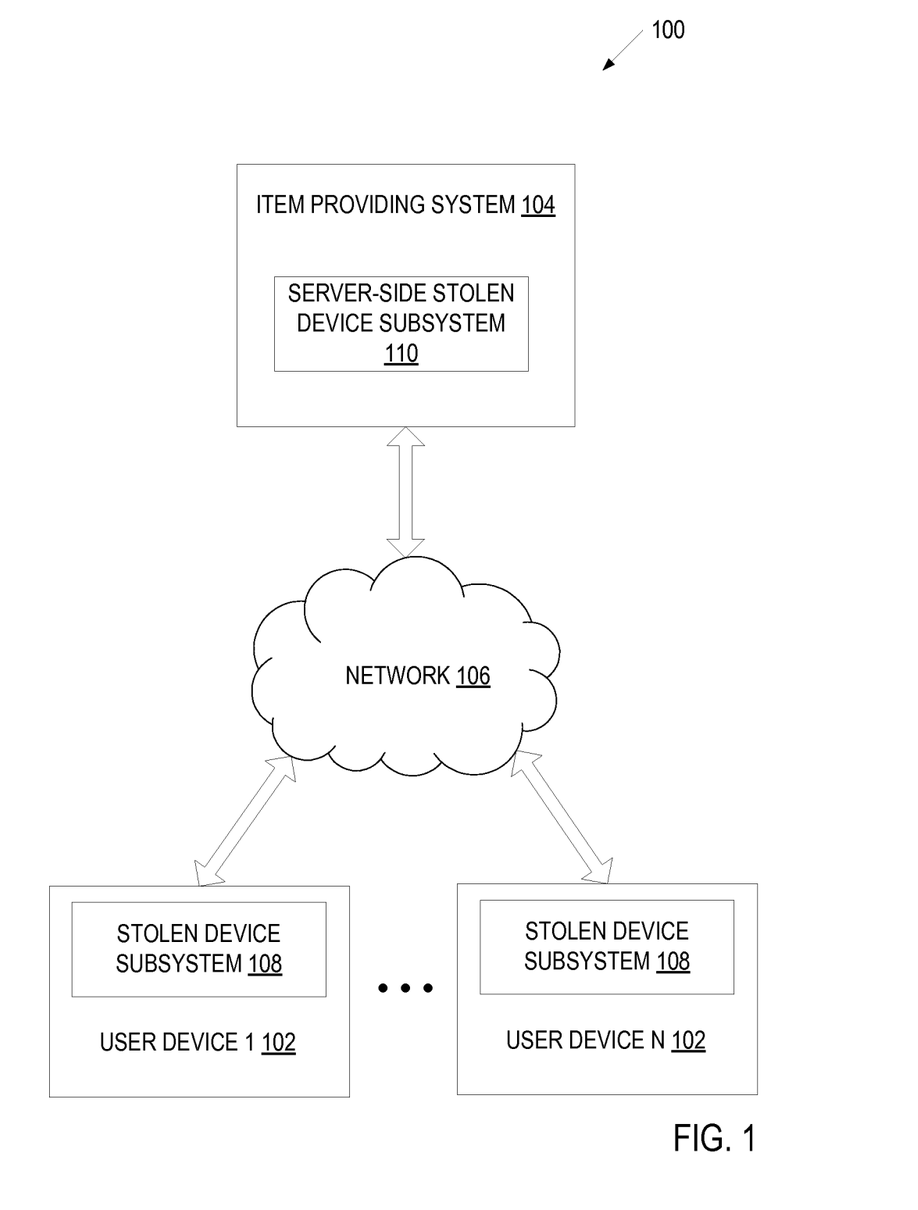
FIG. 1 is a block diagram of an exemplary network architecture in which embodiments of the invention may operate.

FIG. 1 is a block diagram of exemplary network architecture 100 in which embodiments of the invention may operate.

The network architecture 100 may include an item providing system 104 and multiple user devices 102 coupled to the item providing system 104 via a network 106 (e.g., public network such as the Internet or private network such as a local area network (LAN)).

The user devices 102 are variously configured with different functionality and may include various mobile computing devices such as electronic book readers, portable digital assistants, mobile phones, laptop computers, portable media players, tablet computers, cameras, video cameras, netbooks, notebooks, desktop computers, gaming consoles, DVD players, media centers, and the like. In some embodiments, the user devices 102 are configured to enable consumption of one or more types of media items including, for example, electronic texts (e.g., eBooks, electronic magazines, digital newspapers), digital audio (e.g., music, audible books), digital video (e.g., movies, television, short clips), images (e.g., art, photographs), and multi-media content.

The item providing system 104 downloads items, upgrades, and/or other information to the user devices 102 registered with the item providing system 104 via the network 106. The item providing system 104 also receives various requests, instructions and other data from the user devices 102 via the network 106. The item providing system 104 may include one or more machines (e.g., one or more server computer systems, routers, gateways) that have processing and storage capabilities to provide the above functionality.

Communication between the item providing system 104 and a user device 102 may be enabled via any communication infrastructure. One example of such an infrastructure includes a combination of a wide area network (WAN) and wireless infrastructure, which allows a user to use the user device 102 to purchase items and consume items without being tethered to the item providing system 104 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 102. Yet alternatively, the wireless infrastructure may be provided by an access point (e.g., WiFi access point) provider system.

The communication infrastructure may also include a communication-enabling system that serves as an intermediary in passing information between the item providing system 104 and the wireless carrier. The communication-enabling system may communicate with the wireless carrier via a dedicated channel, and may communicate with the item providing system 104 via a non-dedicated communication mechanism, e.g., a public network such as the Internet.

In one embodiment, the user device 102 includes a stolen device subsystem 108 that allows the user device 102 to determine if the user device 102 has been stolen and to generate an audible alert when the user device has been stolen. In one embodiment, the stolen device subsystem 108 receives a stolen notification from a server-side stolen device subsystem 110. The server-side stolen device subsystem 110 may identify that a user device 102 is stolen upon receiving an indication from the owner of the user device 102. This indication may be provided by, for example, the owner connecting to a website of the item providing system 104 (via a personal computer) and changing the mode of the user device 102 to a stolen mode. In another example, the device owner can provide an indication via other means such as email, instant messaging or phone (e.g., by contacting customer support of the item providing system 104). When the mode of the user device 102 is changed to the stolen mode, the server-side stolen device subsystem 110 sends the stolen notification to the stolen device subsystem 108 of the appropriate user device 102. For example, the server-side stolen device subsystem 110 communicates with the user device 102 via the network 106 and instructs the user device 102 to generate an audible alert. The server-side stolen device subsystem 110 can also instruct the user device 102 to disable access to specific data stored on the user device 102 and disable the remaining functionality of the user device 102 except for a set of functions that facilitate the generation of the audible alert and/or an authentication challenge. The stolen notification can instruct the user device 102 to generate the audible alert, such as, for example, by playing back a recording that the user device has been stolen. The stolen notification can also instruct the user device to flash a message on the display of the user device 102.

In another embodiment, the owner may also indicate that the user device 102 is missing when the owner is unsure whether the user device 102 has been stolen or has been lost, and the server-side stolen device subsystem 110 can notify the stolen device subsystem 108 of the appropriate user device 102 that the user device 102 is in the missing mode, allowing the stolen device subsystem 108 to take further action, such as authentication operations to authenticate a current user of the user device 102. T In another embodiment, the stolen device subsystem 108 can determine that the user device 102 is stolen by itself without the user of the server-side stolen device subsystem 110 as described in more detail below.

As will be discussed in more detail below, the server-side stolen device subsystem 110 and the stolen device subsystem 108 can provide other features that further facilitate the detection and alert generation when the user devices 102 have been stolen from their rightful owners.

Figure 2:
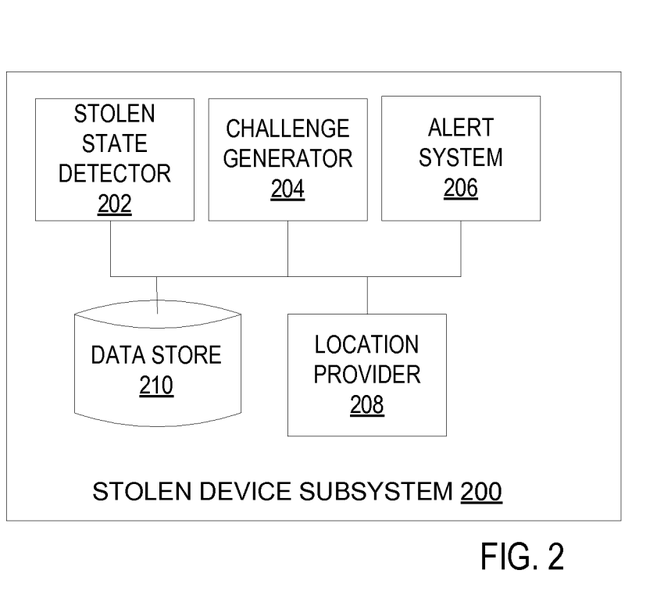
FIG. 2 is a block diagram of one embodiment of a stolen device subsystem.

FIG. 2 is a block diagram of one embodiment of a stolen device subsystem 200. The stolen device subsystem 200 may be the same as stolen device subsystem 108 of FIG. 1 and may include a stolen state detector 202, a challenge generator 204, an alert system 206, a location provider 210, and a data store 210. The components of the stolen device subsystem 200 may represent modules that can be combined together or separated into further modules, according to some embodiments.

The stolen state detector 202 allows the user device to determine that the user device has been stolen. In one embodiment, the stolen state detector 202 receives a stolen notification from the item providing system that the user device has been stolen to determine that the user device has been stolen. Upon receiving the stolen notification, the stolen state detector 202 instructs the alert system 206 to generate an audible alert using a speaker of the user device. Alternatively, upon receiving the stolen notification, the stolen state detector 202 can instruct the challenge generator 204 to generate a challenge to authenticate the user as an owner of the user device. If the user fails the challenge, the stolen state detector 202 instructs the alert system 206 to generate the audible alert.

In another embodiment, the stolen state detector 202 determines that the user device might be stolen and needs to be authenticated. For example, in one embodiment, the stolen state detector 202 can identify a list of locations where the rightful owner has used the user device in the past. The stolen state detector 202 can obtain a current location from the location provider 208 and determine if the current location is on the list of locations. If the current location is not on the list, the stolen state detector 202 detects that that the user needs to be authenticated. When the user needs to be authenticated, the stolen state detector 202 instructs the challenge generator 204 to generate a challenge that would be hard for other people other than the owner of the user device to guess (or that only the owner of the user device can answer), and prompts the user to respond to the challenge. When the response is not successfully verified, the stolen state detector 202 instructs the alert system 206 to generate the audible alert. In one embodiment, the alert system 206 sends one or more signals to one or more speakers of the user device to generate the audible alert. In general, speakers receive electrical signals from a processing device and convert the electrical signals into sound. The speakers may be piezoelectric speakers, magnetostrictive speakers, electrostatic loudspeakers, buzzers, or other electrical or mechanical components that can create the audible alert. In another embodiment, the alert system 206 can also send one or more signals to a display to display a message, such as flashing the display with the message that this user device has been stolen.

In another embodiment, the stolen state detector 202 detects that the user needs to be authenticated by identifying a normal pattern of locations where the owner commonly uses the user device. For example, the location provider 208 can determine the current location of the user device using, for example, GPS, triangulation, MCC and MNC data, etc, stored or collected by the user device, or location data received from the item providing system 104. The location provider 208 can store the location data in the data store 210. The stolen state detector 202 uses the location data to identify the normal pattern of locations, and determines that a current location or a current pattern of locations deviates from the normal pattern of locations. For example, one owner may user his or her user device while travelling on public transit between two cities in a normal pattern. When the user device is stolen, the thief may use the user device in a location that deviates from the normal pattern. When used in a location that deviates from the normal pattern, the stolen state detector 202 detects that the user needs to be authenticated as the rightful owner of the user device.

In another embodiment, the stolen state detector 202 detects that the user needs to be authenticated by identifying an expected location of the owner using calendar data stored in the data store 210, and determining that a current location (from the location provider 208) does not match the expected location of the user device. For example, an owner of the user device may have a calendar entry for a meeting scheduled in a Seattle, Wash. at noon on a particular day; however, the stolen state detector 202 determines that the current location of the user device is Portland, Oreg. When the stolen state detector 202 detects such conditions, the stolen state detector 202 can force the user of the user device to be authenticated as described herein.

In another embodiment, the stolen state detector 202 detects that the user needs to be authenticated by receiving a stolen notification from the item providing system. In one embodiment, instead of the stolen notification automatically causing the audible alert to be generated, the stolen notification may cause the stolen state detector 202 to authenticate the user before generating the audible alert. For example, the stolen notification may include a multi-device access warning that indicates that user data, stored on the item providing system, is being accessed by the user device as well as by another user device. Alternatively, the stolen state detector 202 could receive two separate notifications—one notification to generate the audible alert and another notification to authenticate the user before generating the audible alert.

In another embodiment, the stolen state detector 202 detects that the user needs to be authenticated by determining that the user device has exceeded a specified number of unsuccessful login attempts by the user.

In one embodiment, the challenge generator 204 generates the challenge based on user data stored in the data store 210. In one embodiment, the challenge may include a question about a list of items having at least one counterfeit item and at least one valid item. For example, an electronic book reader may include a list of reading items having at least one reading item that the owner has read or purchased and at least one reading item that the owner has not read or purchased. The user can successfully answer the question by identifying which ones of the list of reading items the owner has read or purchased. In another embodiment, the usage data stored in the data store 210 is a history of purchase items by the owner and the challenge includes a list having at least one of the purchase items from the history and at least one counterfeit purchase item. The challenge requires the user to correctly identify one or all of the purchase items from the list. For example, the challenge may require the user to mark only the correct purchase items in the list. In another embodiment, the usage data stored in the data store 210 is a history of recently consumed items by the owner and the challenge includes a list having at least one of the recently consumed items from the history and at least one counterfeit consumed item. The challenge requires the user to correctly identify one or all of the consumed items from the list. In another embodiment, the usage data stored in the data store 210 is a history of locations of where the owner has consumed an item and the challenge includes a list having at least one of the locations of the history and at least one counterfeit location. The challenge requires the user to correctly identify one or all of the locations from the list. Alternatively, the challenge generator 204 can use other usage data when generating the challenge to authenticate the user as the owner of the user device.

In another embodiment, the challenge generator 204 generates the challenge based on location data stored in the data store 210. In one embodiment, the location data stored in the data store 210 is a history of locations of where the owner has used the user device and the challenge includes a list having at least one of the locations of the history and at least one counterfeit location. The challenge requires the user to correctly identify one or all of the locations from the list. Alternatively, the challenge generator 204 can use other location data when generating the challenge to authenticate the user as the owner of the user device. It should also be noted that although the challenges above describe using lists, the challenges may be presented to the user in other manners as would be appreciated by one of ordinary skill in the art having the benefit of this disclosure.

Figure 3:
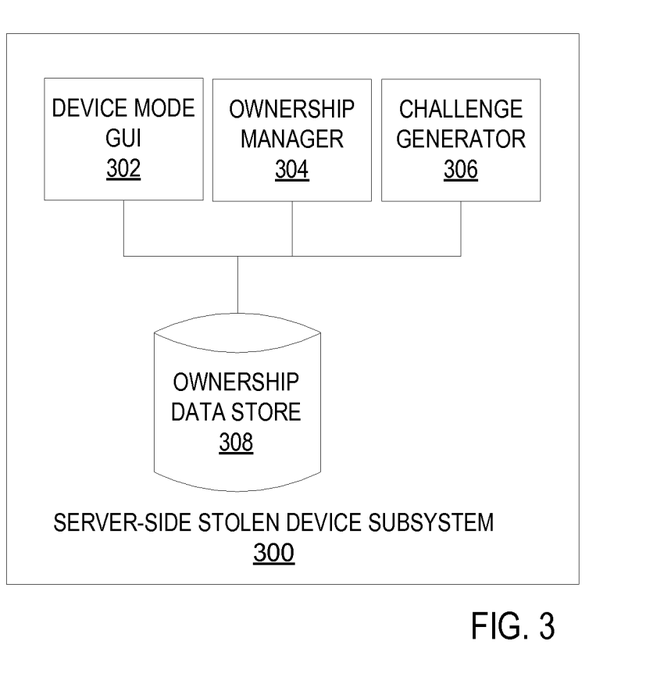
FIG. 3 is a block diagram of one embodiment of a server-side stolen device subsystem.

FIG. 3 is a block diagram of one embodiment of a server-side stolen device subsystem 300. The server-side stolen device subsystem 300 may be the same as the server-side stolen device subsystem 110 of FIG. 1 and may include a device mode graphical user interface (GUI) 302, an ownership manager 304, a challenge generator 306, and an ownership data store 308. The components of the server-side stolen device subsystem 300 may represent modules that can be combined together or separated into further modules, according to some embodiments.

The device mode GUI 302 allows an owner of a user device to change the mode of the user device. The device mode GUI 302 may be displayed when, for example, a user enters information identifying the user account, select a user device associated with the user account, and activates a device mode option for the user device. The device mode GUI 302 may present a list of available modes and allow a user to select a desired mode from the list. For example, a user may choose a stolen device mode (or a missing device mode) from the list if the user device has been stolen (or lost).

The ownership manager 304 identifies a user device that is stolen upon detecting that the user device mode has changed to a stolen mode (e.g., via the device mode GUI 302) or upon receiving an indication from the user via other means (e.g., email, instant messaging, phone or any other means). Then, the ownership manager 304 communicates with the user device to generate an audible alert, such as by sending a stolen notification. The ownership manager 304 may communicate with the user device upon remotely connecting to the user device (e.g., via a wireless network if the user device is in the wireless mode) or by waiting until the user device attempts to connect to the item providing system 104 (e.g., when the user device periodically calls "home"). The ownership manager 304 may send a stolen notification that the user device is in the stolen mode. The ownership manager 304 can also instruct the stolen device subsystem to authenticate the current user, and/or instruct the stolen device subsystem 300 to disable one or more features of the user device. For example, the ownership manager 304 can instruct the user device to disable access to the content stored on the user device (e.g., preventing a user from selecting menu options or control elements that provide access to data stored on the user device), to disable the ability to purchase items using the user device (e.g., single-click purchasing), or to disable all functionality of the user device 102 except for a set of functions that facilitate the generation of the audible alert and/or the authentication challenge.

In one embodiment, the server-side stolen device subsystem 300 receives notification from the stolen device subsystem 200 that the user of the user device needs to be authenticated. In response, the challenge generator 306 generates a challenge to authenticate the user as the owner, and the ownership manger 304 communicates the generated challenge to the stolen device subsystem 200 to prompt the user to response to this challenge. The challenge generated by the challenge generator 306 may be the first authentication challenge or may be a subsequent, additional challenge. For example, the stolen device subsystem 200 may have already presented a first authentication challenge to the user, and the second authentication challenge is performed when the user device connects to the item providing system, for example, upon failure of the first authentication challenge, or when other conditions apply. The stolen device subsystem 200 receives a response from the user to respond to the challenge and determines if the response successfully authenticates the user as the owner of the user device. The challenge generator 306 may generate the challenge based on data stored in the ownership data store 308 and/or data stored in the data store 210, for example, usage data, location data, personal identifying information, or the like.

The ownership data store 308 stores data identifying rightful owners of various user devices (e.g., individuals who bought new user devices). The ownership manager 210 may also store records of transfers of ownership of user devices in the ownership data store 308. An ownership transfer record can be created upon receiving an indication that the current owner intends to transfer the user device to another individual or entity. The ownership manager 304 uses the ownership records to allow an appropriate user of the user device to be considered the owner of the user device. The ownership records stored in the ownership data store 308 can be used to authenticate a user trying to change the mode of the user device to the stolen mode. The challenge generator 306, when providing one or more additional authentication challenges to the user device to authenticate the user as a rightful owner of the user device, can also use the ownership records. The ownership data store 308 may represent a single or multiple data structures (databases, repositories, files, etc.) residing on one or more mass storage devices, such as magnetic or optical storage based disks, tapes or hard drives.

Figure 4:
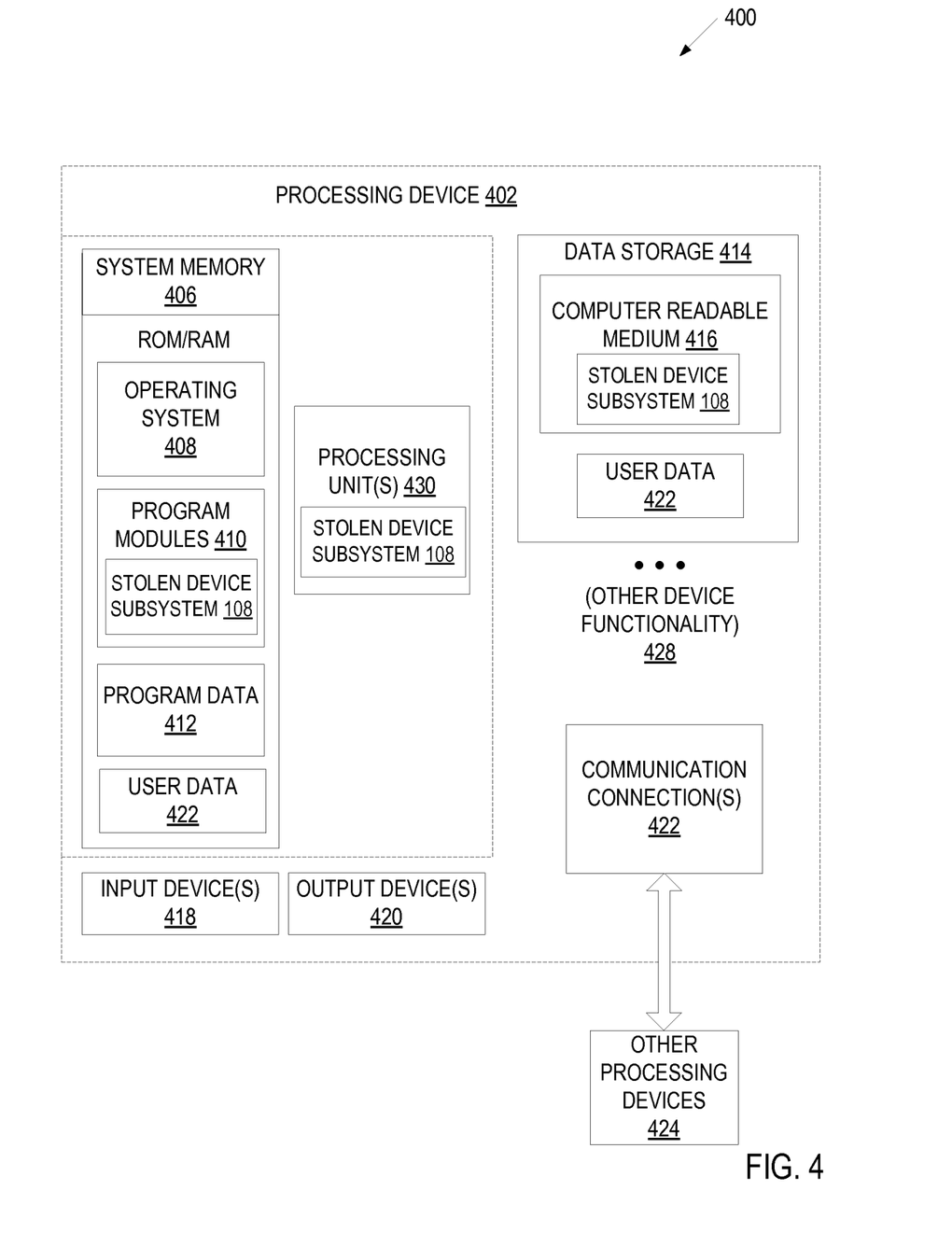
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including stolen device subsystem 108, program data 412, user data 422, and/or other components. The user device 400 performs functions by using the processing unit(s) 404 to execute the stolen device subsystem 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the stolen device subsystem 108) embodying any one or more of the methodologies or functions described herein. As shown, instructions of the stolen device subsystem 108 may also reside, completely or at least partially, within the system memory 406 and/or within the processing unit(s) 430 during execution thereof by the user device 400, the system memory 406 and the processing unit(s) 430 also constituting computer-readable media. The instructions of the stolen device subsystem 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include one or more communication interface mechanisms 422. These communication interface mechanisms 422 allow the user device 400 to interact with other processing devices 424, such as remote computers, the item providing system, and so forth. The communication interface mechanisms 422 may allow the user device 400 to receive a telephone ring and also communicate with the item providing system in a data mode.

The above-enumerated list of modules is representative and is not exhaustive of the types of functions performed by the user device 400. As indicated by the label "Other Device Functionality" 428, the user device 400 may include additional functions.

FIGS. 5-8 illustrate methods performed in accordance with various embodiments of the invention. The methods are performed by processing logic that may comprise hardware (circuitry, dedicated logic, etc.), software (such as is run on a general purpose computer system or a dedicated machine), or a combination of both.

Figure 5:
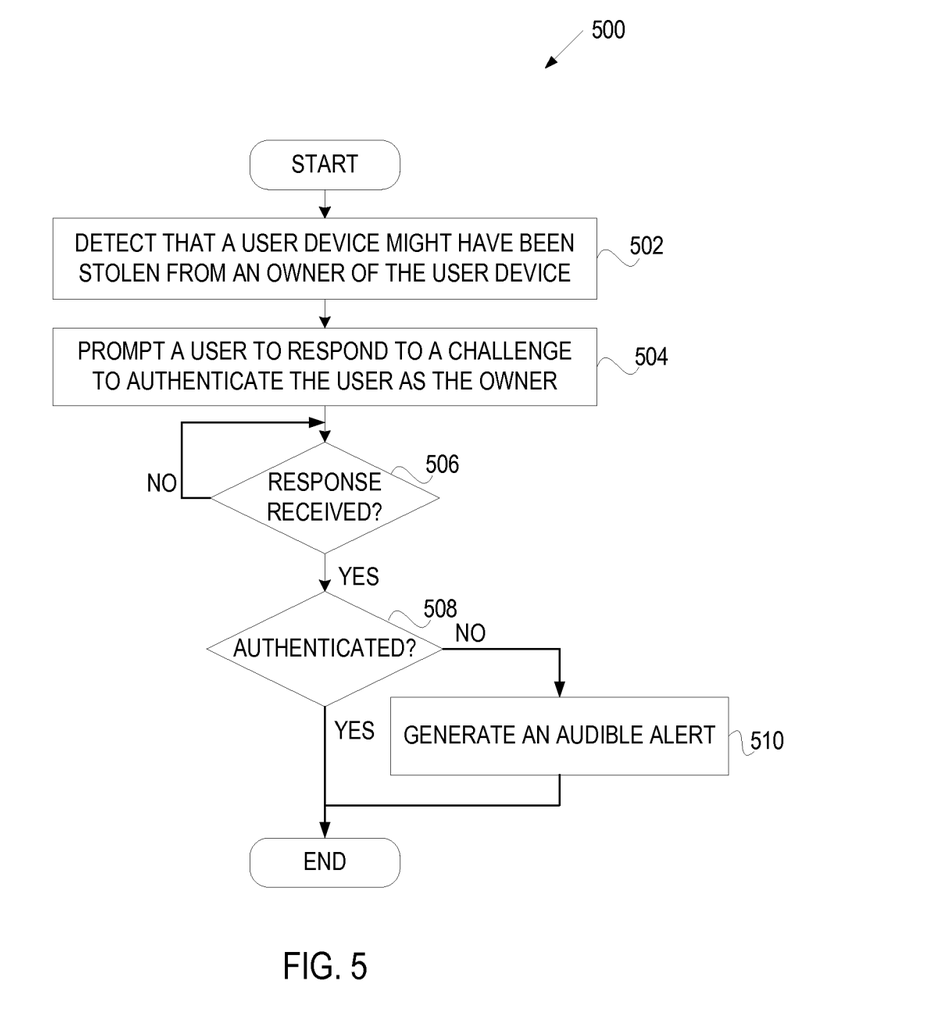
FIG. 5 is a flow diagram of one embodiment of a method for generating an audible alert when a user device is stolen.

FIG. 5 is a flow diagram of one embodiment of a method 500 for generating an audible alert when a user device is stolen. In one embodiment, a user device (e.g., user device 102 of FIG. 1) performs the method 500. In another embodiment, the user device and a server (e.g., item providing system 104 of FIG. 1) perform the method 500.

Referring to FIG. 5, method 500 starts by detecting that a user device might have been stolen from an owner of the user device (block 502). In particular, the user device detects that a current user of the user device needs to be authenticated. When the user device might have been stolen, the user device prompts a user to respond to a challenge to authenticate the user as the owner (block 504). The user device determines if the response has been received (block 506). When the response is received, the user device determines whether the response authenticates the user as the owner (block 508). If the response does not authenticate the user as the owner, the user devices generates an audible alert (block 510), otherwise the method ends. The audible alert may be a loud and obnoxious sound, a recording of a message that the user device has been stolen, or other sounds that would attract attention to the thief.

In some embodiments, the user device detects that the user needs to be authenticated (i.e., the user device might be stolen) by receiving a stolen notification from a server computing system (e.g., item providing system 104). In some embodiments, the server computing system provides a mechanism for the owner to change the mode of the user device to a stolen mode to trigger the authentication process on the user device. In other embodiments, the user device detects that the user needs to be authenticated by itself by detecting certain conditions, such as, for example, when the location of the user device deviates from a normal pattern of locations. For example, the owner of the user device who very rarely travels outside of California may request that the mode of the user device be changed to a stolen mode when the user device is located outside of California. In other embodiments, the device mode can be changed to a stolen mode when the user device moves outside of a specific geographic area or a predefined distance from a certain location, or when a current user is first requested to provide data (e.g., a password or a code) confirming that he or she is a rightful owner of the user device, but fails to authenticate.

In some embodiments, the user device generates the challenge based on usage data stored on the user device. In other embodiments, the user device generates the challenges based on location data. Alternatively, the user device may use other data to generate the challenges, such as personal identifying information and the like. In one embodiment, the user device generates the challenge to include a question about a list of items having at least one counterfeit item and at least one valid item. For example, the list of items may be a list of reading items that the owner of the user device (e.g., electronic book reader) has read or purchased. When the user device receives a response from the user, the user device determines if the response successfully answers the question. If the user is authenticated as the owner, nothing happens; but if the user is not authenticated, the user device generates the audible alert.

In some embodiments, the user device disables one or more features of the user device when the user's response does not successfully answer the challenge. The user device may also be instructed by the item providing system to disable one or more features of the user device. For example, the user device may prevent access to personal identifying information stored on the user device or stored on the item providing system, prevent access to content stored on the user device, or prevent a user from purchasing items using the user device (e.g., single-click purchasing or cookie-enabled purchasing). These features may be disabled until the user can verify himself or herself as the rightful owner of the user device.

In some embodiments, the user device may notify the item providing system of the unsuccessful response when the user device connects to the item providing system. This may cause additional operations to be performed to determine if the user is the owner of the user device, such as generating a second authentication challenge by the item providing service. When the user device receives the second challenge from the item providing system, the user device prompts the user to respond to the challenge. If the user's response answers the challenge correctly, the user is authenticated; otherwise, the user has not been authenticated and the user device generates the audible alert. It should be noted in some embodiments, the item providing service does not generate the second challenge, but sends data to the user device for generating the challenge. Alternatively, one or more challenges may be generated in other ways as would be appreciated by one of ordinary skill in the art having the benefit of this disclosure.

Figure 6:
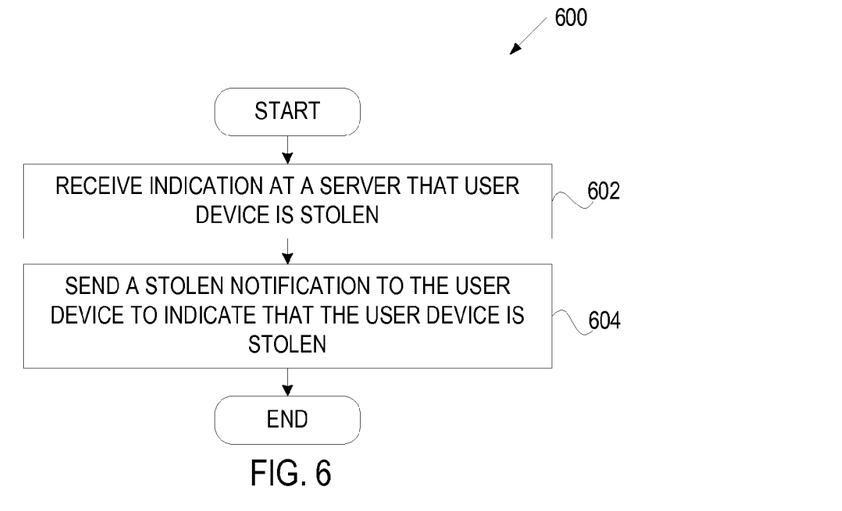
FIG. 6 is a flow diagram of one embodiment of a server-side method for sending notification that a user device is stolen.

FIG. 6 is a flow diagram of one embodiment of a server-side method 600 for sending notification that a user device is stolen. In one embodiment, a server (e.g., item providing system 104 of FIG. 1) performs the method 600.

Referring to FIG. 6, method 600 begins with the server receiving an indication that the user device is stolen (block 602). For example, the server may receive a request (e.g., via a website) to change a mode of the user device to a stolen mode. Upon receiving the indication that the user device is stolen at block 602, the server sends a stolen notification to the user device to indicate that the user device is stolen (block 604), and the method ends. The stolen notification may include instructions to generate the audible alert or may include instructions that the user device needs to authenticate the user of the user device.

Figure 7:
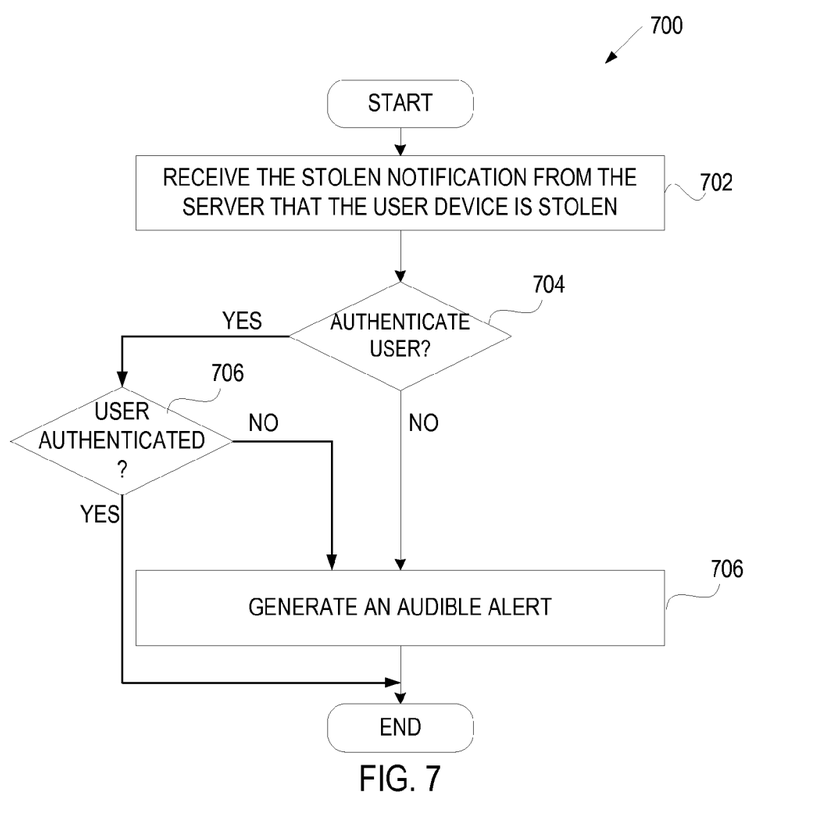
FIG. 7 is a flow diagram of one embodiment of a client-side method for receiving notification from a server that a user device is stolen.

FIG. 7 is a flow diagram of one embodiment of a client-side method 700 for receiving notification from a server that a user device is stolen. In one embodiment, a user device (e.g., user device 102 of FIG. 1) performs the method 500.

Referring to FIG. 7, method 700 begins with the user device receiving the stolen notification from the server (block 702). Upon receiving the stolen notification, the user device determines if the stolen notification includes instructions to authenticate the user or to generate the audible alert (block 704). If the stolen notification does not require user authentication at block 704, the user device generates the audible alert (block 706). However, if the stolen notification requires user authentication, the user device determines if the user is authenticated (block 706). If the user is not authenticated, the user device generates the audible alert at block 706; otherwise, the user device does not generate the audible alert, and the method ends.

Figure 8:
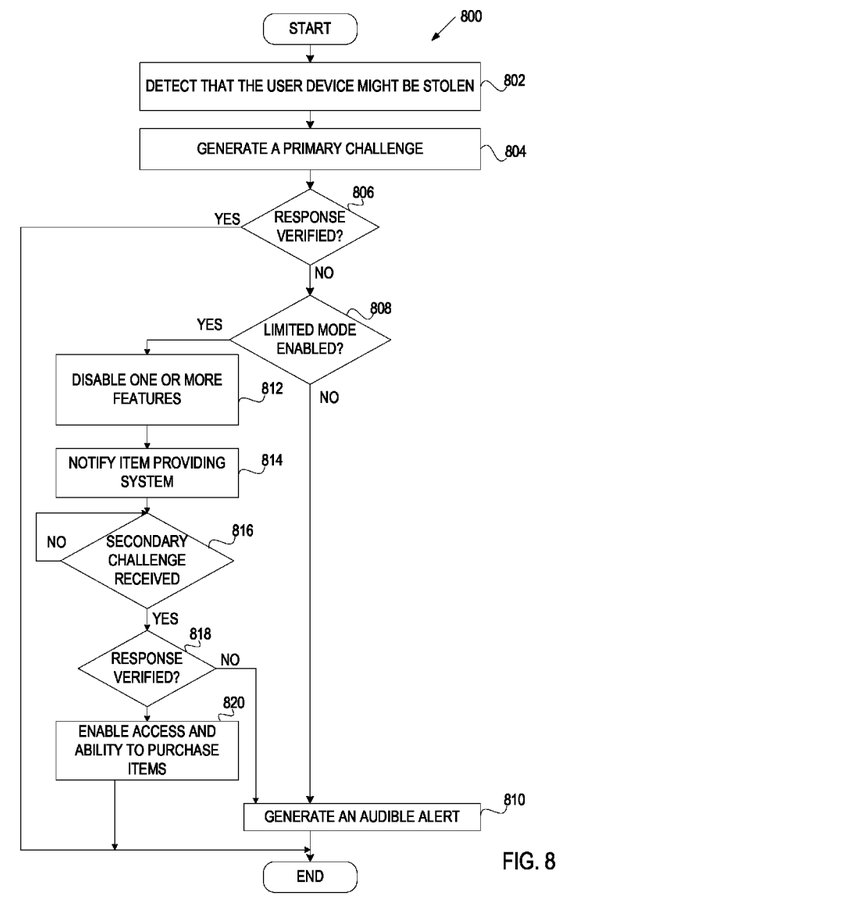
FIG. 8 is a flow diagram of another embodiment of a method for generating an audible alert when a user device is stolen.

FIG. 8 is a flow diagram of another embodiment of a method 800 for generating an audible alert when a user device is stolen. In one embodiment, a user device (e.g., user device 102 of FIG. 1) performs the method 800. In another embodiment, the user device and a server (e.g., item providing system 104 of FIG. 1) perform the method 800.

Referring to FIG. 8, method 800 starts by detecting that a user device might have been stolen from an owner of the user device (block 802). In particular, the user device detects that a current user of the user device needs to be authenticated. In one embodiment, the user device identifies a list of locations where the owner has used the user device in the past and determines that a current location is not on the list of locations. In another embodiment, the user device determines a normal pattern of locations where the owner commonly uses the user device and determines that a current location or a current pattern of locations of the user device deviates form the normal pattern. In another embodiment, the user device identifies an expected location of the owner using calendar data and determines that a current location of the user device does not match the expected location. In another embodiment, the user device receives a stolen notification from the item providing system that indicates that the user needs to be authenticated. The stolen notification, for example, may be a multi-device access warning that is generated when multiple devices, including the user device and another user device, are accessing user data stored on the server computing system. In another embodiment, the user device determines that the user has exceeded a specified number of unsuccessful login attempts. Alternatively, other methods may be used to detect that the user needs to be authenticated as would be appreciated by one of ordinary skill in the art having the benefit of this disclosure.

When the user device might have been stolen (i.e., needs to be authenticated), the user device generates a primary challenge (first challenge) to authenticate the current user as the owner of the user device (block 804). The user device determines if the user's response correctly answers the challenge (block 806). If the user's response is verified, the method ends. However, if at block 806, the user's response is not verified, the user device determines if a limited mode is enabled (block 808). If the limited mode is not enabled, the user device generates an audible alert (block 810). However, if the limited mode is enabled, the user device disables one or more features of the user device (block 812) and notifies the item providing system that the user device might be stolen (block 814). The user device, for example, can disable access to the personal identifying information, and can disable the ability to purchase items using the user device. In response to the notification, the item providing system generates a second challenge to authenticate the user (or sends data to the user device to generate the second challenge). At block 816, the user device waits to receive the second challenge from the item providing system to authenticate the user as the owner (or waits to receive data to generate the second challenge). At block 818, the user device determines if the user's response correctly answers the second challenge. If the user's response is verified at block 818, the user device enables the access and purchasing ability (block 820), and the method ends. If the user's response is not verified at block 818, the user device generates the audible alert at block 810, and the method ends.

Figure 9:
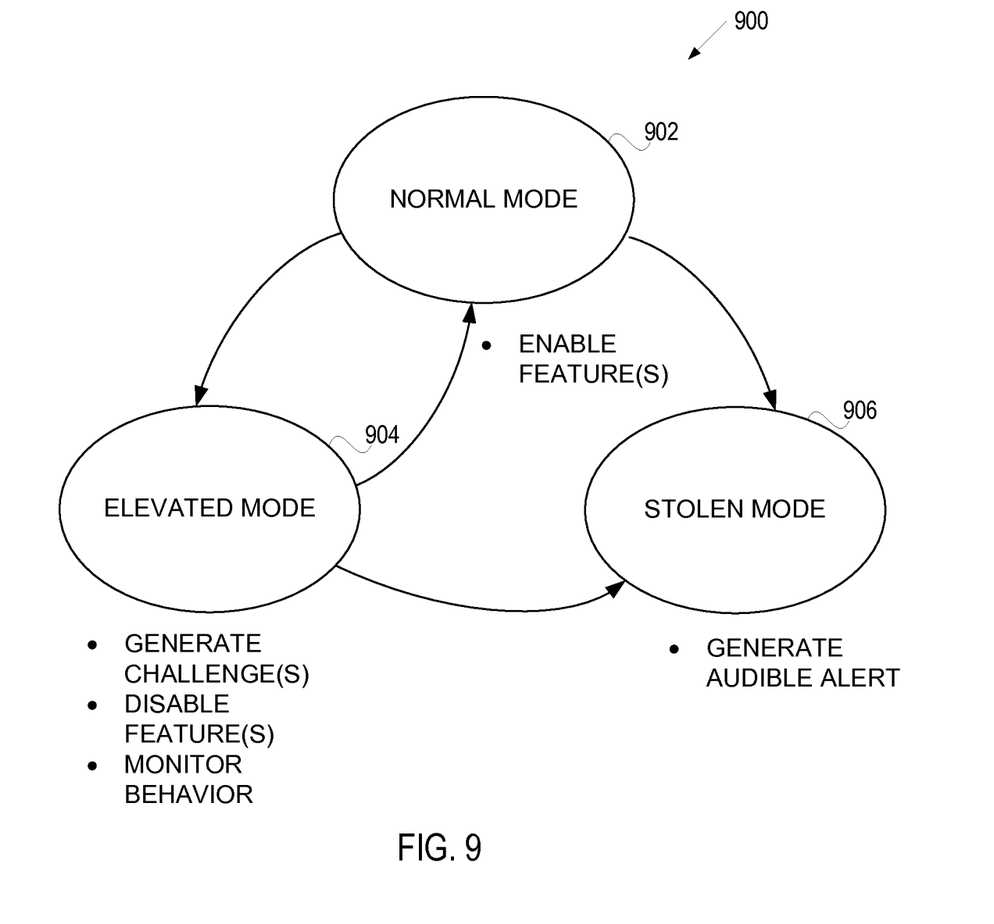
FIG. 9 illustrates a state machine diagram for tracking modes of a user device according to one embodiment.

FIG. 9 illustrates a state machine diagram 900 for tracking modes of a user device according to one embodiment. The state machine may be implemented by processing logic that may comprise hardware (circuitry, dedicated logic, etc.), software (such as is run on a general purpose computer system or a dedicated machine), or a combination of both. In one embodiment, the stolen device subsystem 108 of the user device 102 of FIG. 1 implements the state machine. Alternatively, other components of the user device 102 and/or the item providing system 104 of FIG. 1 may implement the state machine.

The state machine includes three states, including a normal mode 902, an elevated mode 904, and a stolen mode 906. During normal mode 902, the user device operates normally, and can periodically determine if the user device has been stolen or if the user needs to be authenticated. The user device transitions to the stolen mode 906 when the user device determines that the user device has been stolen, and transitions to the elevated mode 904 when the user needs to be authenticated. During stolen mode 906, the user device generates an audible alert and may perform other operations, such as displaying a message on a display, or the like. The user device may transition directly from normal mode 902 to stolen mode 906, for example, when the user device receives a stolen notification from the item providing system that the user device has been stolen. Alternatively, the user device may transition from normal mode 902 to stolen mode 906 via the elevated mode 904. During elevated mode 904, the user device generates one or more challenges to the user to authenticate the user as the owner of the user device. In one embodiment, the user device generates a challenge to authenticate a user as the owner when in the elevated mode 904, and determines if a response from the user successfully authenticates the user as the owner. If the response successfully authenticates the user as the owner, the user device transitions to the normal mode 902. However, if the response does not successfully authenticate the user as the owner, the user device transitions to the stolen mode 906, causing the user device to generate the audible alert. During elevated mode 904, the user device may also disable one or more features. For example, the user device can disable at least one of access to user data (e.g., personal identifying information) stored on the user device and/or stored on the server computing system, access to content store on the user device, and/or an ability to purchase items using the user device. During elevated mode 904, the user device may also monitor specific behavior of the user device until normal behavior returns, upon which the user device transitions to the normal mode 902, or until some event occurs that causes the user device to go into a full alert mode, transitioning to the stolen mode 906. For example, during the elevated mode 904, the user device may receive a stolen notification, or may determine the user's login attempts exceed the number of allowed login attempts. For example, the user device can monitor behavior by starting to track locations of the user device while in the elevated mode 904 to detect anomalies in the locations. If anomalies are found, the user device transitions to the stolen mode 906. If none are found, such as after so much time has passed, the user device transitions back to the normal mode 902. Alternatively, the user device may monitor other behavior during the elevated mode 904 and/or the normal mode 902 as would be appreciated by one of ordinary skill in the art having the benefit of this disclosure.

Figure 10:
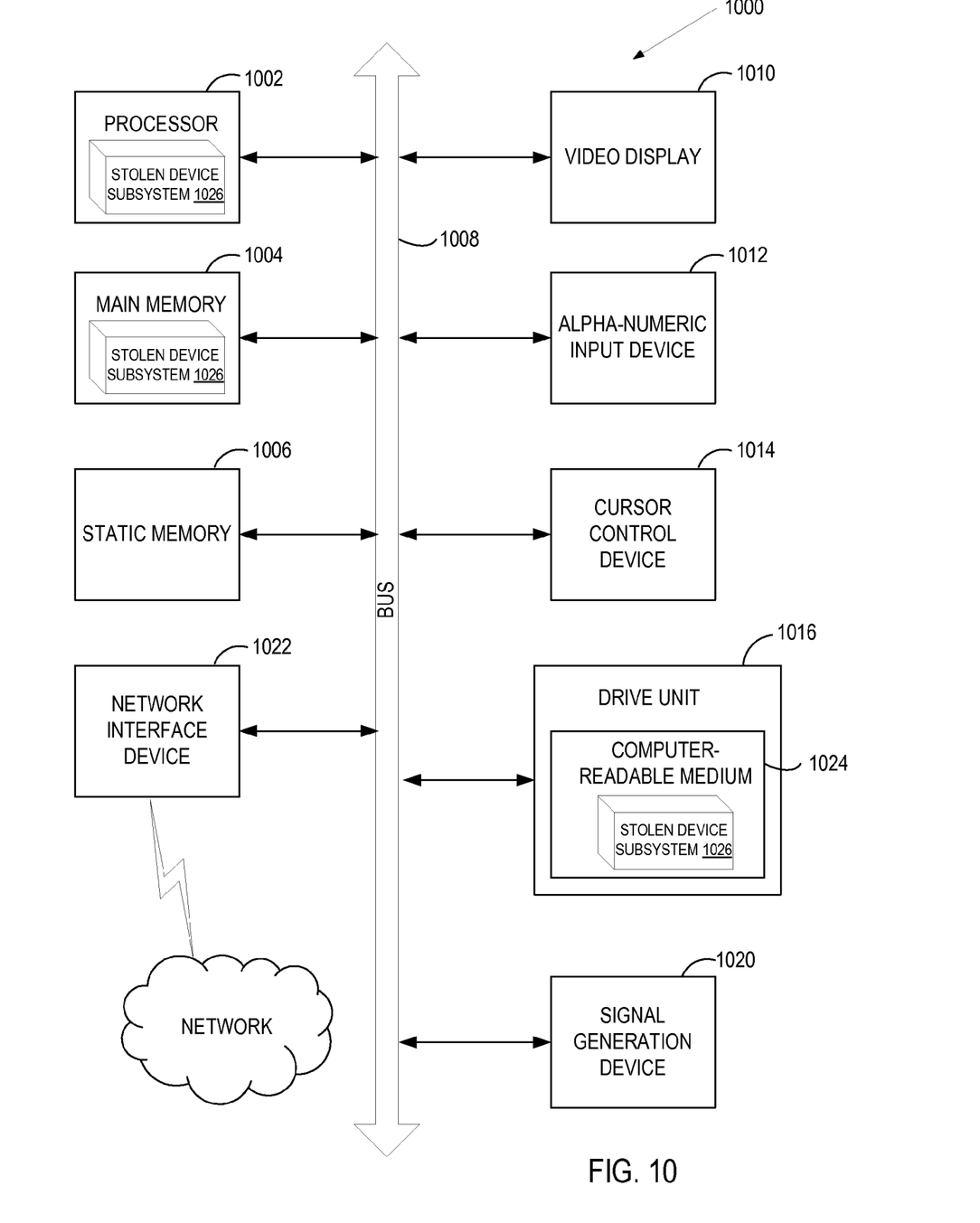
FIG. 10 illustrates a diagrammatic representation of a machine in the exemplary form of a computing system for detecting when a user device is stolen.

FIG. 10 illustrates a diagrammatic representation of a machine in the exemplary form of a computing system 1000 for detecting when a user device is stolen. The computing system 1000 may execute a set of instructions, for causing the machine to perform any one or more of the methodologies discussed herein. The computing system 1000 may be the user device 102 of FIG. 1 or may be the item providing system 104. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the stolen device subsystem 1026 for performing the operations and steps discussed herein. The stolen device subsystem 1026 may be the stolen device subsystem 108 of user device 102 of FIG. 1 or the server-side stolen device subsystem 110 of the item providing system 104 of FIG. 1.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker or a vibration mechanism).

The data storage device 1016 may include a computer-readable medium 1024 on which is stored one or more sets of instructions (e.g., instructions of stolen device subsystem 1026) embodying any one or more of the methodologies or functions described herein. The stolen device subsystem 1026 may also reside, completely or at least partially, within the main memory 1004 and/or within the processor 1002 during execution thereof by the computer system 1000, the main memory 1004 and the processor 1002 also constituting computer-readable media. The stolen device subsystem 1026 may further be transmitted or received over a network via the network interface device 1022.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," determining," "prompting," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
    tracking, by a user device, modes of the user device, wherein the modes comprise a stolen mode and an elevated mode;
    generating, by the user device, a challenge to authenticate a user as an owner of the user device when the user device is in the elevated mode, wherein the challenge comprises a question about a list of history items comprising at least one counterfeit history item and at least one valid history item; and
    generating, by the user device, an audible alert when the user device is in the stolen mode.

2. The method of claim 1, wherein the tracking further comprises:

when in a normal mode, periodically determining if the user device has been stolen or if the user needs to be authenticated;
transitioning to the stolen mode when the user device has been stolen;
transitioning to the elevated mode when the user needs to be authenticated;
determining if a response from the user successfully authenticates the user as the owner of the user device;
transitioning to the normal mode when the response successfully authenticates the user as the owner; and
transitioning to the stolen mode when the response does not successfully authenticate the user as the owner.

3. The method of claim 1, further comprising tracking locations of the user device while in the elevated mode.

4. The method of claim 1, further comprising, while in the elevated mode, disabling at least one of access to personal identifying information stored on the user device, access to content stored on the user device, or an ability to purchase items using the user device.

5. The method of claim 1, wherein the generating the challenge comprises generating the challenge based on usage data.

6. The method of claim 1, wherein the generating the challenge comprises generating the challenge based on location data and the list of history items.

7. The method of claim 1, wherein the list of history items comprises a list of reading items having at least one reading item that the owner has read or purchased and at least one reading item that the owner has not read or purchased, and wherein the user successfully answer the question when the response correctly identifies which ones of the list of reading items the owner has read or purchased.

8. The method of claim 1, further comprising disabling one or more features of the user device when the user device is in the stolen mode.

9. The method of claim 1, further comprising disabling one or more features of the user device when the user device is in the elevated mode.

10. The method of claim 9, wherein the disabling comprises at least one of preventing access to personal identifying information stored on the user device, preventing access to content stored on the user device, or preventing the user of the user device from purchasing items using the user device.

11. The method of claim 1, wherein the tracking comprises:
detecting that the user of the user device needs to be authenticated;
detecting that the user of the user device is stolen;
transitioning to the elevated mode in response to the detecting that the user needs to be authenticated; and
transitioning to the stolen mode in response to the detecting that the user device is stolen.

12. The method of claim 11, wherein the detecting that the user needs to be authenticated comprises:
identifying a list of locations where the owner has used the user device in the past; and
determining that a current location of the user device is not on the list of locations.

13. The method of claim 11, wherein the detecting that the user needs to be authenticated comprises:
identifying a normal pattern of locations where the owner commonly uses the user device; and
determining that a current location or a current pattern of locations of the user device deviates from the normal pattern of locations.

14. The method of claim 13, wherein the detecting that the user needs to be authenticated comprises:
identifying an expected location of the owner using calendar data stored on the user device; and
determining that a current location of the user device does not match the expected location.

15. The method of claim 13, wherein the detecting that the user needs to be authenticated comprises determining that the user has exceeded a specified number of unsuccessful login attempts.

16. A user device comprising:
a signal generation device;
a memory to store modes of the user device, wherein the modes comprise a stolen mode, an elevated mode and a normal mode; and
a processing device, coupled to the memory and the signal generation device, wherein the processing device is configured to determine that the user device is in the stolen mode or the elevated mode and to instruct the signal generation device to generate an audible alert when the user device is in the stolen mode and to generate a challenge to authenticate a user as an owner of the user device when the user device is in the elevated mode, wherein the challenge comprises a question about a list of history items comprising at least one counterfeit history item and at least one valid history item.

17. The user device of claim 16, further comprising a display coupled to the processing device, wherein the processing device is configured to instruct the display to generate a visual alert when the user device is in the stolen mode.

18. A user device comprising:
a signal generation device;
a memory to store modes of the user device, wherein the modes comprise a stolen mode and a normal mode; and
a processing device, coupled to the memory and the signal generation device, wherein the processing device is configured to determine that the user device is in the stolen mode and to instruct the signal generation device to generate an audible alert when the user device is in the stolen mode,
wherein the modes further comprise an elevated mode, and wherein the processing device is configured to disable at least one of access to personal identifying information, preventing access to content stored on the user device, or an ability to purchase items using the user device when in the elevated mode.

19. A non-transitory computer readable storage medium including instructions that, when executed by a processing device, cause the processing device to perform operations comprising:
tracking modes of a user device on the user device, wherein the modes comprise a stolen mode, an elevated mode, and a normal mode;
when in the normal mode, periodically determining if the user device has been stolen or if the user needs to be authenticated;
transitioning to the stolen mode when the user device has been stolen;
generating an audible alert when the user device is in the stolen mode;
transitioning to the elevated mode when the user needs to be authenticated;
generating a challenge that to authenticate a user as the owner of the user device when the user device is in the elevated mode, wherein the challenge comprises a question about a list of history items comprising at least one counterfeit history item and at least one valid history item;

determining if a response from the user successfully authenticates the user as the owner of the user device;

transitioning to the normal mode when the response successfully authenticates the user as the owner; and transitioning to the stolen mode when the response does not successfully authenticate the user as the owner.

20. The computer readable storage medium of claim 19, wherein said transitioning to the stolen mode comprises transitioning to the stolen mode when the user device receives a stolen notification from a server computing system, and wherein said generating the audible alert comprises generating the audible alert upon receiving the stolen notification from the server computing system.

* * * * *